United States Patent [19]
Duggan et al.

[11] Patent Number: 5,756,133
[45] Date of Patent: May 26, 1998

[54] CONTINUOUS GUM BASE PROCESSING WITH COOLING TOWERS

[75] Inventors: James A. Duggan, Machesney Park, Ill.; Kevin R. Tebrinke, Fort Madison, Iowa; Tony R. Puri, Sparta, N.J.; Arthur W. Upmann, Rockton, Ill.

[73] Assignee: Warner-Lambert Company, Morris Plains, N.J.

[21] Appl. No.: 725,408

[22] Filed: Oct. 3, 1996

[51] Int. Cl.$^6$ .................................................. A23G 3/30
[52] U.S. Cl. ...................... 426/3; 426/4; 426/524; 198/435; 99/443 R; 99/443 C
[58] Field of Search .................. 426/3, 4, 524; 198/435; 99/443 R, 443 C

[56] References Cited

U.S. PATENT DOCUMENTS

| | | | |
|---|---|---|---|
| 3,779,410 | 12/1973 | Phillips | 414/418 |
| 4,000,321 | 12/1976 | Mochizuki | 426/5 |
| 4,068,004 | 1/1978 | Carlen | 426/3 |
| 4,117,645 | 10/1978 | Phillips | 426/5 |
| 4,675,190 | 6/1987 | Glass | 426/5 |
| 4,721,620 | 1/1988 | Cherukuri | 426/3 |
| 5,023,093 | 6/1991 | Cherukuri | 426/3 |

Primary Examiner—Carolyn Paden
Attorney, Agent, or Firm—Brooks & Kushman

[57] ABSTRACT

A system for automatically cooling and further processing chewing gum base materials is disclosed. The hot molten chewing gum base material is deposited in lined or coated pans, the pans are picked up by an industrial robot and placed into a pair of spiral cooling towers where the molten material is cooled and solidified. The same or a second industrial robot picks up the pans of cooled gum base material and transports them to a final staging and processing area. The pans of cooled gum base material are placed on a conveyor system or on pallets for further handling and processing.

10 Claims, 4 Drawing Sheets

CONTINUOUS GUM BASE PROCESSING WITH COOLING TOWERS

TECHNICAL FIELD

The invention is directed to an improved system for the continuous process of chewing gum bases.

BACKGROUND OF THE INVENTION

Typically, a chewing gum composition comprises a water-soluble bulk portion, a water-insoluble chewing gum base portion, and typically water-insoluble flavoring agents. The insoluble gum base generally comprises elastomers, elastomer solvents, plasticizers, waxes, emulsifiers, and inorganic fillers. The water-soluble portion dissipates with a portion of the flavoring agent over a period of time during chewing. The gum base portion is retained in the mouth throughout the time that the product chewed.

Chewing gum bases, as well as the chewing gum product itself, are typically produced by a batch-type method, although continuous extruders can also be used. In the batch method, Sigma blade batch mixers are typically utilized. The batch processing, however, tends to be labor-intensive and produces chewing gums of various consistency.

Once the gum base is formed, emulsifiers, such as lecithin, softeners, such as glycerin or Wesson oil, corn syrup, and bulking agents, such as sugars or sugar alcohols are added to the molten mass. Later flavorings, such as flavor oils and/or spray-dried flavors, and sweeteners are added while mixing is continued until a homogeneous mass is achieved. The chewing gum mass is then cooled and later rolled, scored, and wrapped into the final product.

The use of continuous extruders to make chewing gum bases and the final chewing gum product has been developed in order to simplify and reduce the time required to manufacture the gum base and chewing gum products. Continuous extrusions processes also reduce the cost of the final products and produce chewing gum bases and final gum products of more uniform and consistent quality.

The use of continuous extruders to make a final chewing gum product are shown in U.S. Pat. No. 5,135,760 to Degady et al., U.S. Pat. No. 5,045,325 to Lesko et al., and U.S. Pat. No. 4,555,407 to Kramer et al. The use of continuous extruders to produce chewing gum bases are disclosed, for example, in U.S. Pat. Nos. 5,419,919 and 5,486,366, both to Song et al.

The continuous gum base and chewing gum processes disclosed in these patents typically utilize a continuous extrusion machine, such as a twin-screw extruder. These extruders can be co-rotational, counter-rotational, intermeshing or tangential, depending on the requirements and purposes of the system involved. These extruders typically have several different feed inlets where the ingredients are added. The elongated screw mechanisms inside the barrels of the extruders are equipped with different types of elements. Continuous extrusion machines which can be used for producing a chewing gum base or a final chewing gum product, or both, include extruders from Japan Steel Works, Leistriztz, Werner & Pfleiderer Corp., WLS, Buss Mfg. Co., Togum and Baker Perkins.

When gum bases are produced, whether by the batch-type method or with use of a continuous extrusion machine, the molten gum base is typically emptied into coated or lined pans which are then set aside to cool. Once cooled, the slabs or blocks of gum base are set aside or packed into boxes for later use in various chewing gum manufacturing processes.

It is well known that a gum base product can be used for several final gum products, depending on the final composition of the chewing gum.

Methods used to handle the gum base products, including the steps of emptying the base into pans, transporting the pans to a cooling station, cooling the hot gum base material in the pans, and processing the cooled slabs of gum base are time-consuming and labor-intensive. Typically, it can take several hours for the gum base product to cool sufficiently for subsequent handling and processing.

It is the general object of the present invention to provide an improved method and system for the production, cooling, and processing of gum base products. It is also an object of the present invention to provide improved apparatus and methods for cooling a gum base product in order to facilitate improved final processing.

It is still another object of the present invention to provide a cooling apparatus for continuously cooling chewing gum bases and continuously handling them automatically from one stage to another.

These and other objects, benefits, and advantages of the present invention are met by the following description of a preferred embodiment of the invention.

SUMMARY OF THE INVENTION

The present invention provides an improved apparatus, method, and system for handling and cooling gum base products. The gum base product, which preferably is made by a continuous extrusion process, is emptied into coated or lined pans which are then inserted into an automatic cooling apparatus. The cooling apparatus consists of a pair of cooling towers with spiral conveyors which, after passage of the gum base product therethrough, results in a cooled gum base product at the opposite end. The cooled gum base product is then automatically placed on an appropriate conveyor or pallet member so it can be ready for further processing relative to chewing gum production.

Preferably, one or more programmed material handling robots are used to automatically position the pans for filing, place the liquid chewing gum product in the spiral cooling towers, remove the cooled product from the cooler, and position the solidified product for subsequent handling.

Other benefits, features, and advantages of the present invention will become apparent from the following description of the invention, when viewed in accordance with the accompanying drawings and appended claims.

BEST MODE(S) FOR CARRYING OUT THE INVENTION

The present invention is particularly suitable for processing chewing gum bases which are used for final chewing gum products. In general, the present invention provides an apparatus, method and system for handling, cooling, and further processing of the molten gum base product in order to facilitate its use for a final chewing gum product. In this regard, it is to be understood that the present invention can be used for handling, cooling, and further processing gum base products whether the gum bases are produced by a continuous extrusion process, a conventional batch-type process, or in any other conventional manner.

In the preferred embodiment of the present invention, the invention is utilized with a continuous extrusion-type process for producing the chewing gum base. In particular, for use with a continuous gum base process, the present invention facilitates the handling, cooling, and further processing of the gum base as it is extruded immediately from the extruder.

Figure 1:
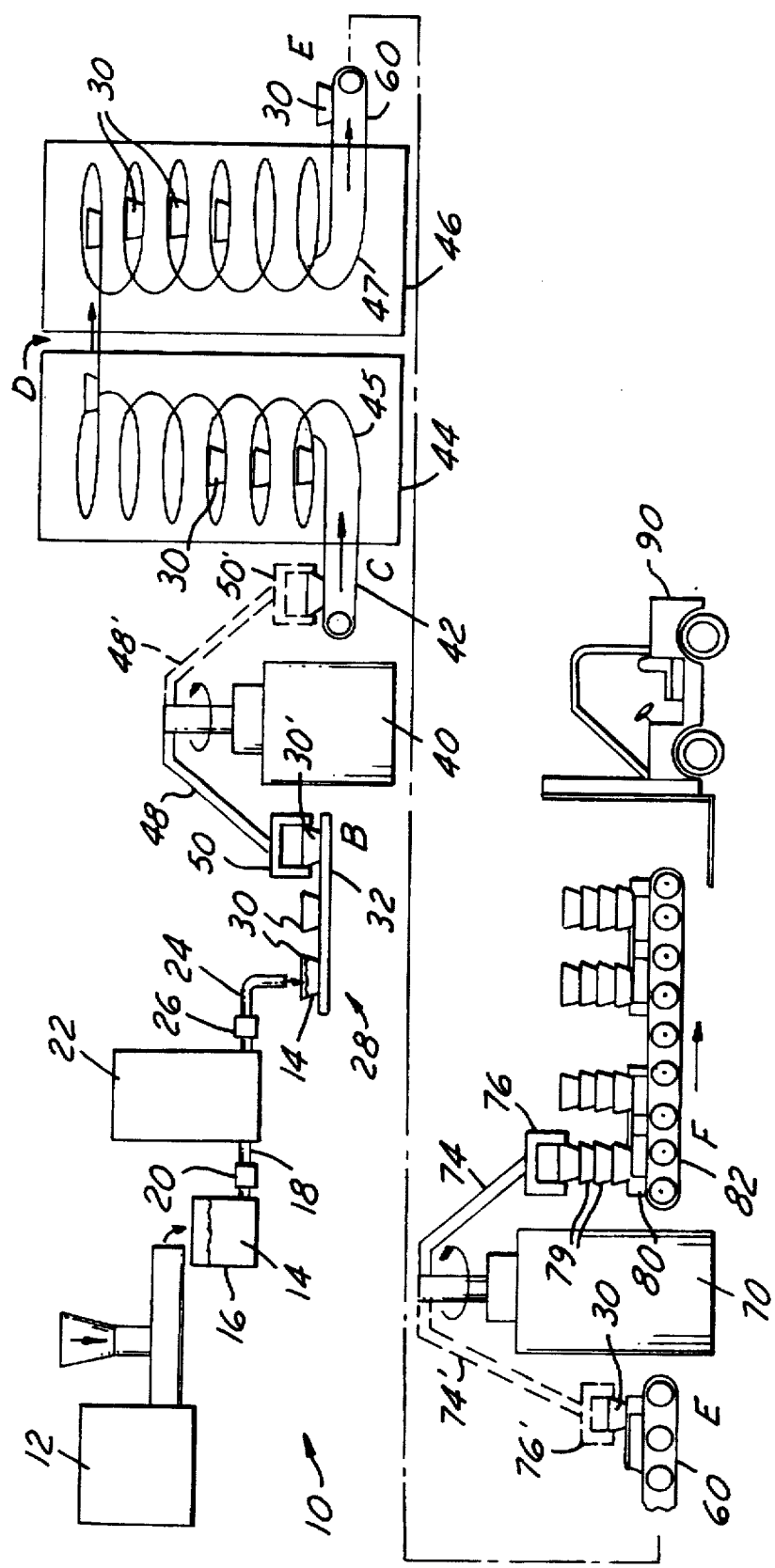
FIG. 1 is a schematic diagram of an automatic handling and cooling system in accordance with the present invention.
Figure 1A:
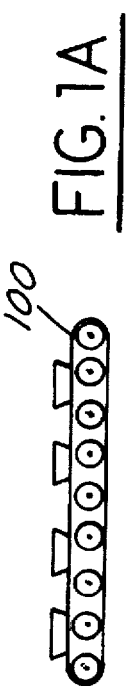
FIG. 1A illustrates an alternate embodiment of a portion of the system shown in FIG. 1.
Figure 2:
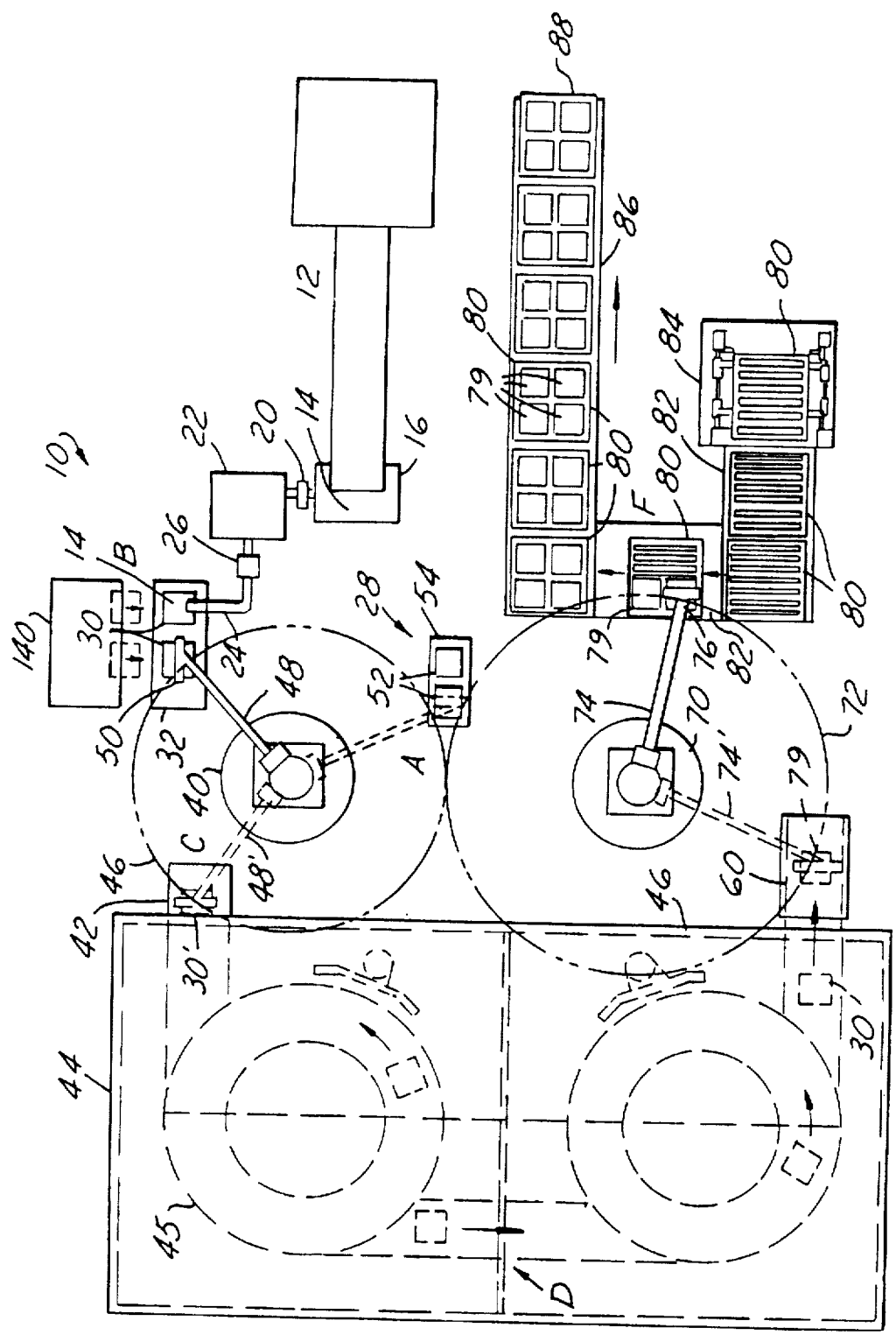
FIG. 2 is a schematic top elevational view of an automatic handling and cooling system in accordance with the present invention.
Figure 3:
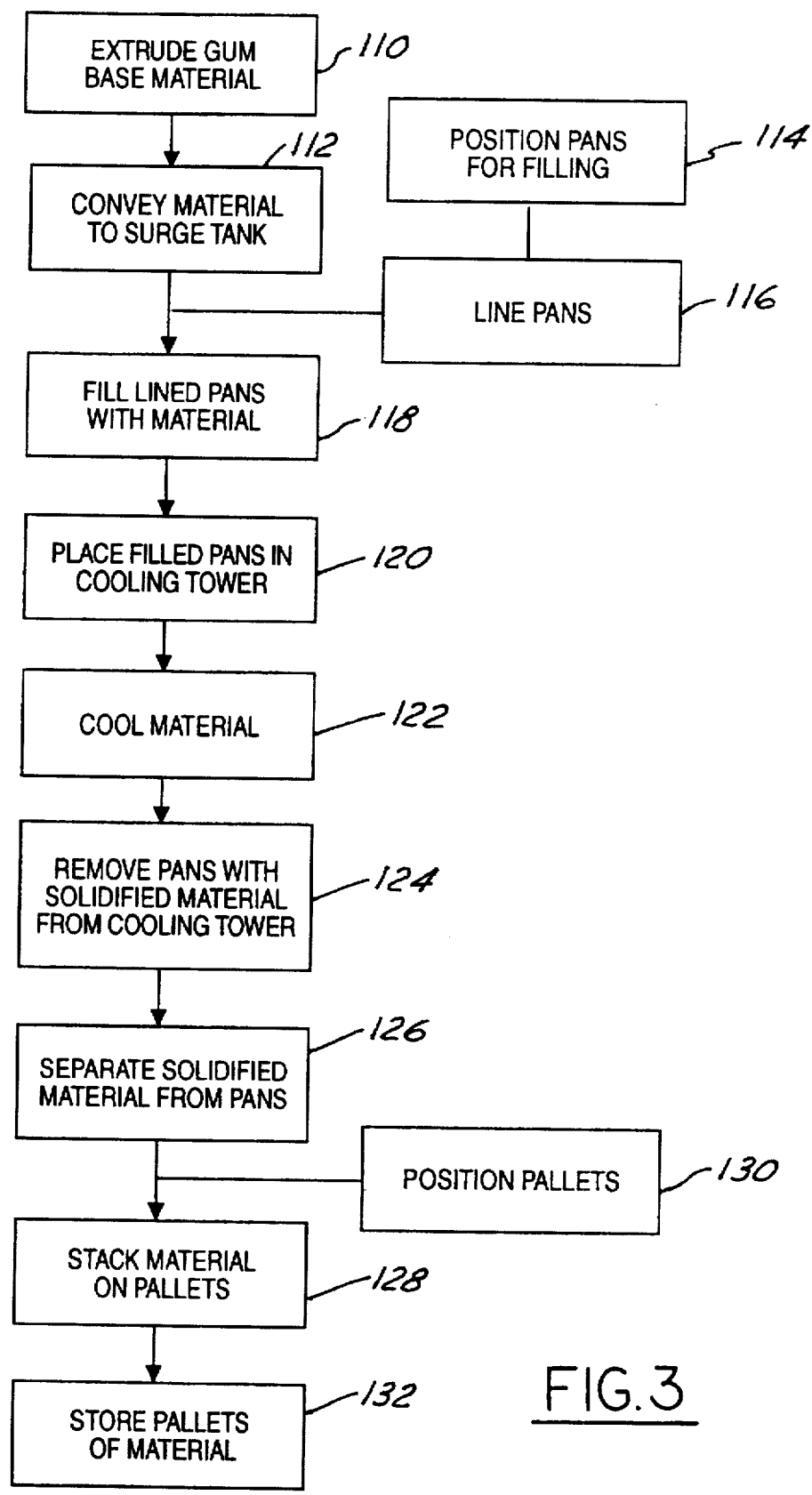
FIG. 3 is a flow chart of a preferred embodiment of the invention.
Figure 4:
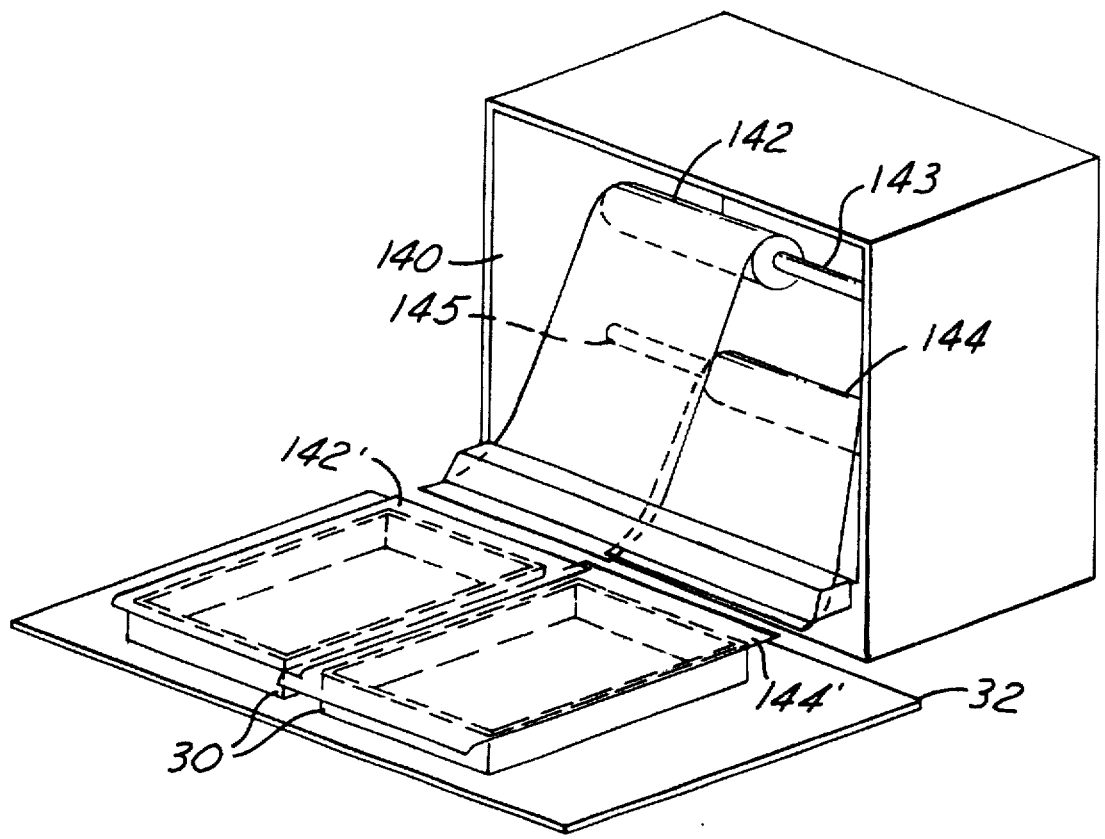
FIG. 4 is a schematic diagram of a pan liner mechanism.

Schematic illustrations of a system in accordance with the present invention are illustrated in FIGS. 1 and 2, with FIG. 1 being a general side elevational view, and FIG. 2 being a top elevational view. FIG. 1A illustrates an alternate embodiment of a portion of the system. FIG. 3 is a flow chart depicting the key steps of a preferred embodiment of the invention and FIG. 4 illustrates a pan lining system. In the drawings, the system is generally referred to by the reference numeral 10.

A continuous extruder 12 is used to produce a gum base product 14 which is briefly stored in an accumulator tank 16. The liquid gum base product is pumped through conduit 18 by pump 20 into surge tank 22. The material is then pumped by pump 26 through conduit 24 to a pan filling station, which is generally referred to by the reference numeral 28. The gum base material 14 is placed into lined or coated pans 30 on a platform 32.

It is standard with conventional gum base processes to coat the pans with a powder material, such as talc, or to line the pans with a plastic material, in order to prevent the tacky molten gum base material from sticking to the pans and thus inhibiting or preventing removal once the material has solidified. In accordance with the preferred embodiment of the present invention, the pans are lined with pieces of plastic material, and more preferably, the plastic liners are fed by a feeding mechanism 140 and positioned automatically in the pans by an industrial robot. This is discussed in more detail below with respect to FIG. 4.

Individual pans of gum base material 30 are automatically picked up by an industrial robot 40, either individually, or in pairs, and moved to the beginning of conveying mechanism 42 which transports the pans into and through a spiral cooling apparatus 44.

In this regard, and as better shown in FIG. 2, the robot 40 has a range of operation 46 which allows its rotating arm 48 to pick up the pans 30 from platform 32 at station "B" and move them to the conveyor 42 at station "C". The arm 48 has a gripping mechanism 50 on one end which allows the robot 40 to manually grip and pick up one or more pans 30. As shown in FIG. 1, the robot 40 is in the process of picking up pan 30' at station "B". The position of the robot arm is also shown in phantom lines by reference numerals 48' and 50' in a position to deposit pan 30' on the conveying mechanism 42 at station "C".

Also, in accordance with the present invention, empty pans are provided within the range of operation 46 of the robot 40. Empty pans 52 are shown at station "A" in FIG. 2 and are positioned on a table member 54. Thus, in use, robot 40 is controlled to pick up empty pans 52 at station "A" from platform 54, move them into position at station "B" on table or platform 32 where the pans are filled with gum base material 14, and then move the pans to station "C" where they are placed on conveyor 42 for entry into the spiral cooling mechanism 44.

As indicated above, although a continuous extruder 12 is shown in the drawings for manufacture of the chewing gum base 14, it is also understood that the chewing gum base can be made by a conventional batch-type process. With a batch-type process, the molten gum base material could be poured into surge tank 22, and then pumped by pump 26 into separate pans 30 for cooling.

In accordance with the present invention, a pair of spiral coolers 44 and 46 are preferably utilized. As shown, the coolers have spiral-shaped conveying mechanisms 45 and 47, respectively, which transport the pans 30 of gum base material through the towers 44 and 46 as the liquid gum base is cooled.

Spiral belt cooling towers of this type are available from T. J. White Co. Typically, these devices are 20–30 feet in width and several stories in height. The temperature inside the spiral coolers 44 and 46 is preferably kept to a level of approximately 30° to 60° F. in order to rapidly cool the material 14. The two spiral conveyors 44 and 46 are positioned adjacent to one another so that the gum base materials can proceed upwardly in the first conveyor on spiral conveyor 45 and be transported to the upper portion of the second conveyor (at point "D") and then proceed downwardly in the second spiral conveyor 47 where it can exit for further handling at the end of conveyor mechanism 60. This is shown as station "E" in the drawings.

When the pans 30 exit from spiral cooler 46, the gum base material is in a solid condition. The time for a pan 30 of liquid gum base material to pass through the spiral coolers 44 and 46, and thus proceed from point "C" to point "E", is approximately 1 to 4 hours.

When the cooled gum base material exits from the spiral conveyor 46 at station "E", it is automatically handled by a second industrial robot 70. Robot 70 has an arc or range of operation 72. The robot 70 has a rotating arm member 74 and a manual hook or grasping mechanism 76 at one end.

Preferred robots for use with the present invention are available from a number of sources, such as Fanuc. In accordance with the present invention, it is also possible to provide one robot to perform the operations of both robots 40 and 70.

Robot 70 picks up one or two pans 30 of cooled and solidified gum base material and moves them into staging area "A" where they are placed on platform or table 54. Suction cups (not shown) on the end of the arm 74 attach to the solidified "blocks" of gum base material and lift then from the pans. The robot 70 then moves the blocks 79 to staging area "F" where they are positioned on pallets 80 which are positioned on conveying mechanism 82. (The empty pans on platform 54 are then moved by robot 40 to staging area "B" where they are reused.)

The pallets 80 are moved into position. A pallet staging mechanism 84 supplies the pallets to the conveying mechanism 82. Once the pallets 80 are filled with a number of the blocks 79 of cooled gum base material, they are passed along the conveying mechanism 82 onto a second pallet conveying and staging mechanism 86. Once the full pallets reach the end 88 of the conveying and handling apparatus mechanism 86, they are picked up for further processing by a high-low mechanism 90 or the like where they are taken for storage or further processing into a final chewing gum product.

An alternative embodiment for handling individual blocks 79 of cooled gum base material is shown in FIG. 1A. In this embodiment, the blocks of cooled gum base material are simply placed on a conveyor 100 by the robot 70 where they are subsequently handled and removed individually for further use. In this regard, the cooled gum base blocks could be taken immediately to a final chewing gum processing area and deposited in batch-type mixers or reheated and melted and used in a continuous chewing gum process.

In general, the process in accordance with the present invention includes a gum base manufacturing system or apparatus (either a continuous extruder or batch-type mixer), a pan filling area, one or more industrial robots, one or more cooling towers to cool and harden the liquid gum base material, and a final handling and storage area. One of the industrial robots is used to move the pans of hot gum base material to the entrance of the first spiral tower, and the second industrial robot is used to take the cooled pans of gum base material from the exit of the spiral conveyors to the final staging area. At the final staging area, the pans of cooled gum base material are available to be processed in various ways, such as placed individually on a conveyor, or being loaded on pallets for subsequent handling by vehicles or other machinery.

The flow chart depicted in FIG. 3 sets forth the key features of a preferred embodiment of the invention. The gum base material is first extruded 110 and conveyed 112 to a surge tank (22). The pans (30) which are positioned 114 on a loading platform (32), preferably by an industrial robot, and lined 116 with a sheet of plastic material, are filled 118 with the liquid gum base material. The filled pans are placed 120 in the cooling mechanism by the robot and allowed to cool 122. The pans exiting from the cooling mechanism with the solidified gum base material are removed 124 by an industrial robot. The robot then separates 126 the blocks of hardened gum base material from the pans and stacks 128 the blocks on a pallet which earlier had been moved into proper position 130. The filled pallets are then stored 132 so that the gum base material can later be easily used in the manufacture of a final gum product.

FIG. 4 shows a feeding mechanism 140 for supplying sheets of plastic material for lining the empty pans. The plastic lining materials is provided in two rolls 142 and 144 of material positioned on shafts 143 and 145, respectively. The material 142 and 144 is fed to a cutting mechanism 146 which cuts the rolled material into individual sheets 142' and 144'. When the empty pans 30 are positioned on platform or table 32, the plastic sheets 142' and 144' are positioned over them. In this regard, the sheets can be pulled from the rolls of material manually, or by robot 40. Once the sheets of material are positioned over the pans, the pans are filled with gum base material. The weight of the material causes the liners to conform to the shape of the pans.

It should be appreciated that the apparatuses, methods and systems of the present invention are capable of being incorporated in the form of a variety of embodiments, only some of which have been illustrated and described above. The invention may be embodied in other forms without departing from its spirit or scope of the invention. The described embodiments are to be considered in all respects only as illustrative and not restrictive and the scope of the invention used, there- fore indicated by the appended claims rather than by the foregoing description. All changes that come within the meaning and range of equivalency of the claims are to be embraced within their scope.

What is claimed is:

1. A method for processing chewing gum base materials comprising the steps of:

producing said gum base material in liquid form by a continuous extrusion processor;

depositing said liquid gum base material into a plurality of containers;

placing said containers into a cooling mechanism for a time and temperature sufficient to cool and solidify said gum base material, said cooling mechanism having a pair of adjacent spiral conveying devices in cooperative operative relationship with each other, a first conveying device transporting said containers in an upward spiral path while being subjected to cooling air and a second conveying device transporting said containers in a downward spiral path while also being subjected to cooling air; and moving said containers with cooled gum base material from said cooling apparatus to a staging area.

2. The method as set forth in claim 1 wherein said containers are placed into said cooling mechanism by a robotic mechanism.

3. The method as set forth in claim 1 wherein said containers with cooled gum base material are moved from said cooling mechanism to said staging area by a robotic mechanism.

4. The method as set forth in claim 1 further comprising the step of placing said containers with cooled gum base material on pallets in said staging area.

5. The method as set forth in claim 1 further comprising the step of placing said containers with cooled gum base material on a conveying mechanism in said staging area.

6. The method as set forth in claim 1 further comprising the step of placing a protective lining member in said containers prior to depositing therein of said liquid gum base material.

7. The method as set forth in claim 6 wherein said protective lining material is supplied automatically by at least a feeding mechanism for supplying sheets of plastic material.

8. The method as set forth in claim 1 further comprising the step of removing said cooled gum base material from said containers by a robotic mechanism.

9. The method as set forth in claim 8 further comprising removing said cooled gum base material by vacuum suction from said containers.

10. The method as set forth in claim 1 wherein said containers comprise metal pans and are lined with a plastic sheet material.

* * * * *